(No Model.) 3 Sheets—Sheet 1.

J. P. VALLIN.
BEARING.

No. 508,787. Patented Nov. 14, 1893.

Witnesses
George Baumann
John Revell

Inventor
Jonas Petter Vallin
By his Attys
Howson and Howson (No Model.) 3 Sheets—Sheet 2.

J. P. VALLIN.
BEARING.

No. 508,787. Patented Nov. 14, 1893.

Witnesses
George Baumann
John Revell

Inventor
Jonas Petter Vallin
By his Attys
Howson and Howson (No Model.) 3 Sheets—Sheet 3.
J. P. VALLIN.
BEARING.
No. 508,787. Patented Nov. 14, 1893.
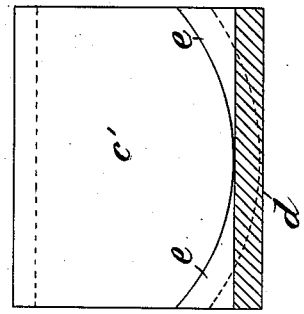
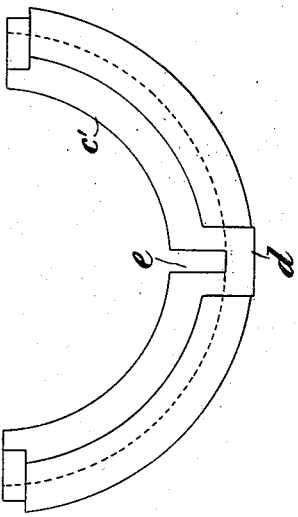
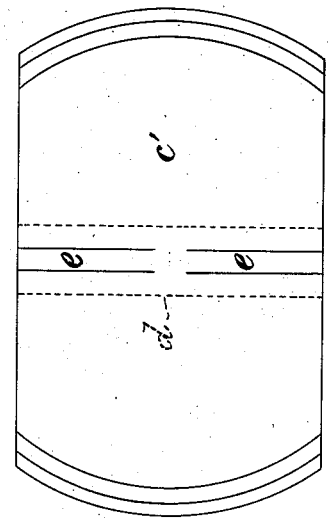

UNITED STATES PATENT OFFICE.

JONAS PETTER VALLIN, OF SKATTMANSO BRUK, VITTINGE, SWEDEN.

BEARING.

SPECIFICATION forming part of Letters Patent No. 508,787, dated November 14, 1893.

Application filed August 4, 1891. Serial No. 401,681. (No model.)

*To all whom it may concern:*

Be it known that I, JONAS PETTER VALLIN, a subject of the King of Sweden and Norway, residing at Skattmanso Bruk, Vittinge, Sweden, have invented certain new and useful Improvements in Bearings, of which the following is a specification.

This invention relates to bearings for rotating shafts, and according thereto I employ a spherical part disposed around and firmly connected to the shaft and running in correspondingly shaped brasses.

Figure 1:
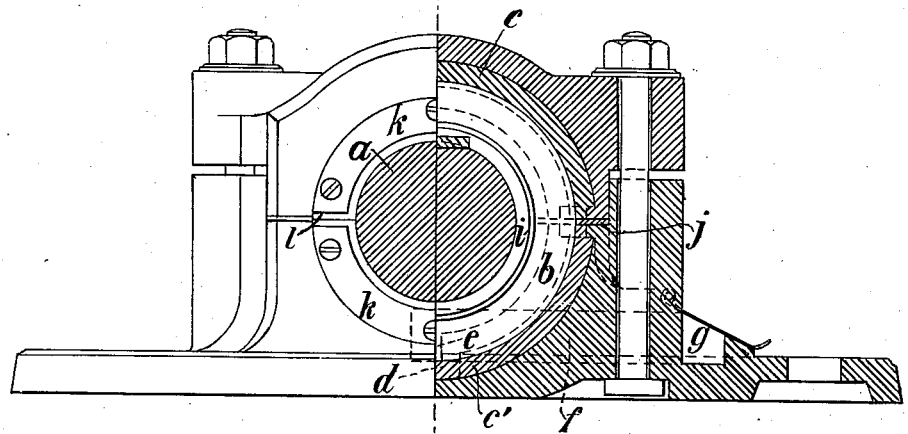
Figure 2:
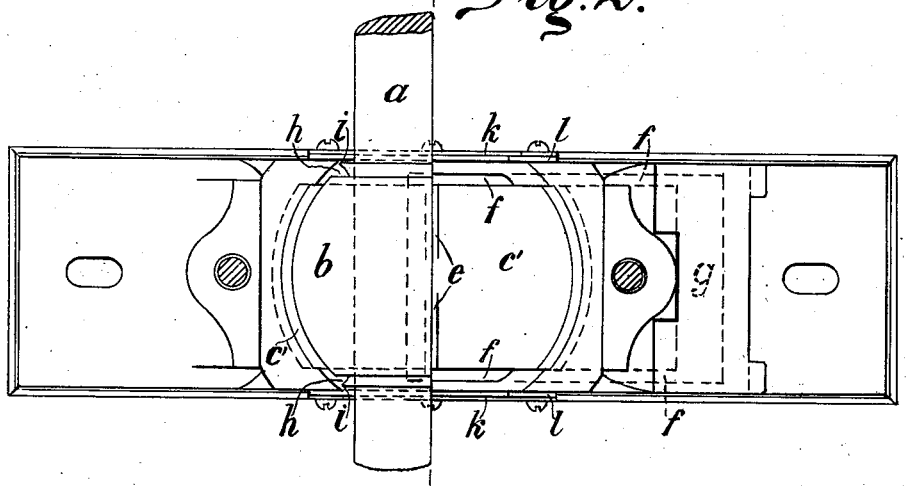
Figure 3:
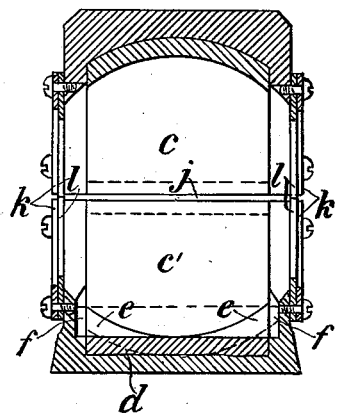
Figure 4:
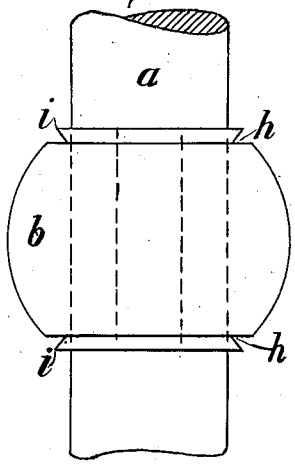

Figure 1 of the drawings represents such a bearing in elevation and vertical section. Fig. 2 is a plan of the same with the cover removed. Fig. 3 is a vertical cross section of the bearing itself. Fig. 4 shows separately the shaft with the spherical portion secured thereto. Figs. 5, 6 and 7 show the lower brass in elevation, section and plan, on a larger scale.

On the shaft $a$ is fastened a spherical part $b$ preferably of steel, adapted to enter the brasses $c\ c'$ which are internally formed with a spherical concavity and by preference are cast around the spherical part $b$ between it and the body or under part and the cover of the bearing. In the lower brass $c'$, which is provided with a flange $d$ entering a notch made in the body of the bearing, is arranged a lubricating groove $e$ (or grooves) which by two passages $f\ f$ (Figs. 1, 2 and 3) on each side of the brasses in the body of the bearing, is in communication with an oil reservoir $g$ arranged in the lower part of the body of the bearing and provided with a cover.

During the rotation of the spherical portion $b$ with the shaft $a$ oil is taken from the lubricating groove $e$. In consequence of the centrifugal action the oil will collect around that part of $b$ which is of the largest diameter, but not finding any exit will be caused to spread over the surface of the brasses.

In order to prevent oil or lubricant flowing out from between the spherical part $b$ and the brasses, along the shaft, two grooves $h, h$ are cut into the part $b$, and the oil which accumulates in these grooves is, by the centrifugal force, driven out against the edge $i$ of the grooves and thrown against the walls of the box along which it flows down to the groove $e$. By this arrangement the oil is kept circulating whereby effective lubrication is secured. In order to prevent the oil from being thrown out through the joint between the brasses a piece of lead $j$ or other suitable material is inserted between the brasses.

The brim of the oil reservoir $g$ is disposed on a level with the highest part of the lubricating groove $e$, see Fig. 1, whereby all waste of oil is prevented.

In order to prevent the entrance of dust and impurities in the bearing, rings $l$ of leather or other flexible material fitting closely to the shaft are secured on opposite sides of the bearing by means of screws and rings $k$ of iron or other metal. To permit of the easy removal of the rings $l$ they are made in two halves as also the rings $k$.

Among the advantages of a bearing arranged according to this invention may be mentioned the following, namely, strains in the bearing are prevented, the lubrication is very complete and is effected without the use of a wick, oil is saved, the bearing can be kept clean and there will be practically no oil spilt. The spherical part $b$ may, when it has become worn, easily be replaced by a new one, and thus the shaft is saved.

I claim as my invention—

1. In bearings for a rotating shaft, the combination of the spherical part $b$ concentrically disposed around the shaft and firmly connected thereto, the brasses $c, c'$, the brass $c$ being provided with the lubricating groove $e$, and the body of the bearing having the passages $f\ f$ and the oil reservoir $g$, substantially as set forth.

2. In bearings for a rotating shaft, the combination of the spherical part $b$ concentrically disposed around the shaft and firmly connected thereto and provided with grooves $h\ h$, the brasses $c, c'$, the brass $c$ being provided with the groove $e$ and the body of the bearing having the passages $f\ f$, and the oil reservoir $g$, substantially as set forth.

3. In bearings for a rotating shaft, the combination of the spherical part $b$ concentrically disposed around the shaft and firmly connected thereto and being provided with grooves $h\ h$, the brasses $c,\ c'$, the brass $c$ being provided with the groove $e$, the body of the bearing having the passages $f\ f$, and the oil reservoir $g$, and the rings $l$ and $k$, substantially as set forth.

In testimony whereof I have signed my name to this specification in the presence of two subscribing witnesses.

JONAS PETTER VALLIN.

Witnesses:
  FREDRIK L. ENQUIST,
  ROBERT APELGREN,
    *Both of Stockholm.*